Figure 1:
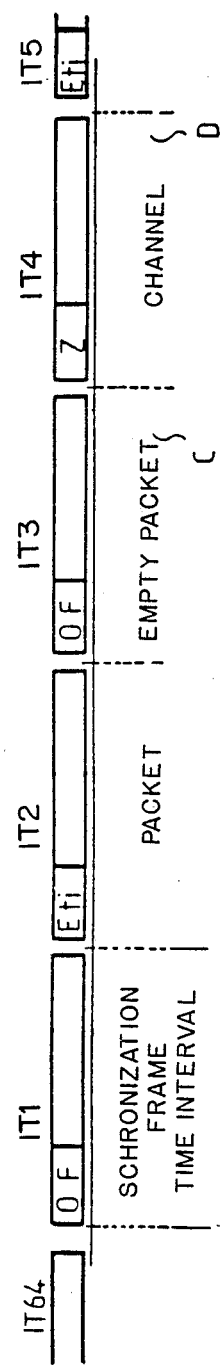

United States Patent [19]

Francois et al.

[11] Patent Number: 4,905,225
[45] Date of Patent: Feb. 27, 1990

[54] COMMUNICATION SYSTEM FOR TIMING MULTIPLEX HYBRIDS

[76] Inventors: Joël François, Prat Cotel Bihan, Saint Quay Perros; Jean-Paul Quinquis, Rue de Cornic, both of 22700 Perros-Guirec, France

[21] Appl. No.: 153,248

[22] Filed: Feb. 8, 1988

[30] Foreign Application Priority Data

Feb. 27, 1987 [FR] France ................ 87 02892

[51] Int. Cl.⁴ .................................... H04Q 11/04
[52] U.S. Cl. ............................................. 370/60
[58] Field of Search ....................... 370/94, 60, 58

[56] References Cited
U.S. PATENT DOCUMENTS 4,630,260 12/1986 Toy et al. ........................ 370/60
4,651,318 3/1987 Luderer ........................... 370/60

Primary Examiner—Robert L. Griffin
Assistant Examiner—Wellington Chin
Attorney, Agent, or Firm—Laff, Whitesel, Conte & Saret

[57] ABSTRACT

Each entering and outgoing hybrid time multiplexed signal is made up of frames with fixed length time intervals each carrying a block of words that form either a packet or a channel, except the first time interval of each frame which contains a frame synchronization block. The multiplexed signal is applied to a packet time switch using a paragonal conversion, as in the switch described in European patent document EP No. 113 639. The switch is comprised of input and output rotation matrices, a packet buffer memory, and a channel buffer memory, a packet/channel discrimination memory, a packet label translation memory, a set of memory files for the addresses of the packets in the packet buffer memory, a read control memory for reading in the channel buffer memory, a time base and a control unit capable of changing the contents of the translation memory of the discrimination memory and of the read control memory in terms of the traffic to carry.

9 Claims, 10 Drawing Sheets

TIMING SWITCH

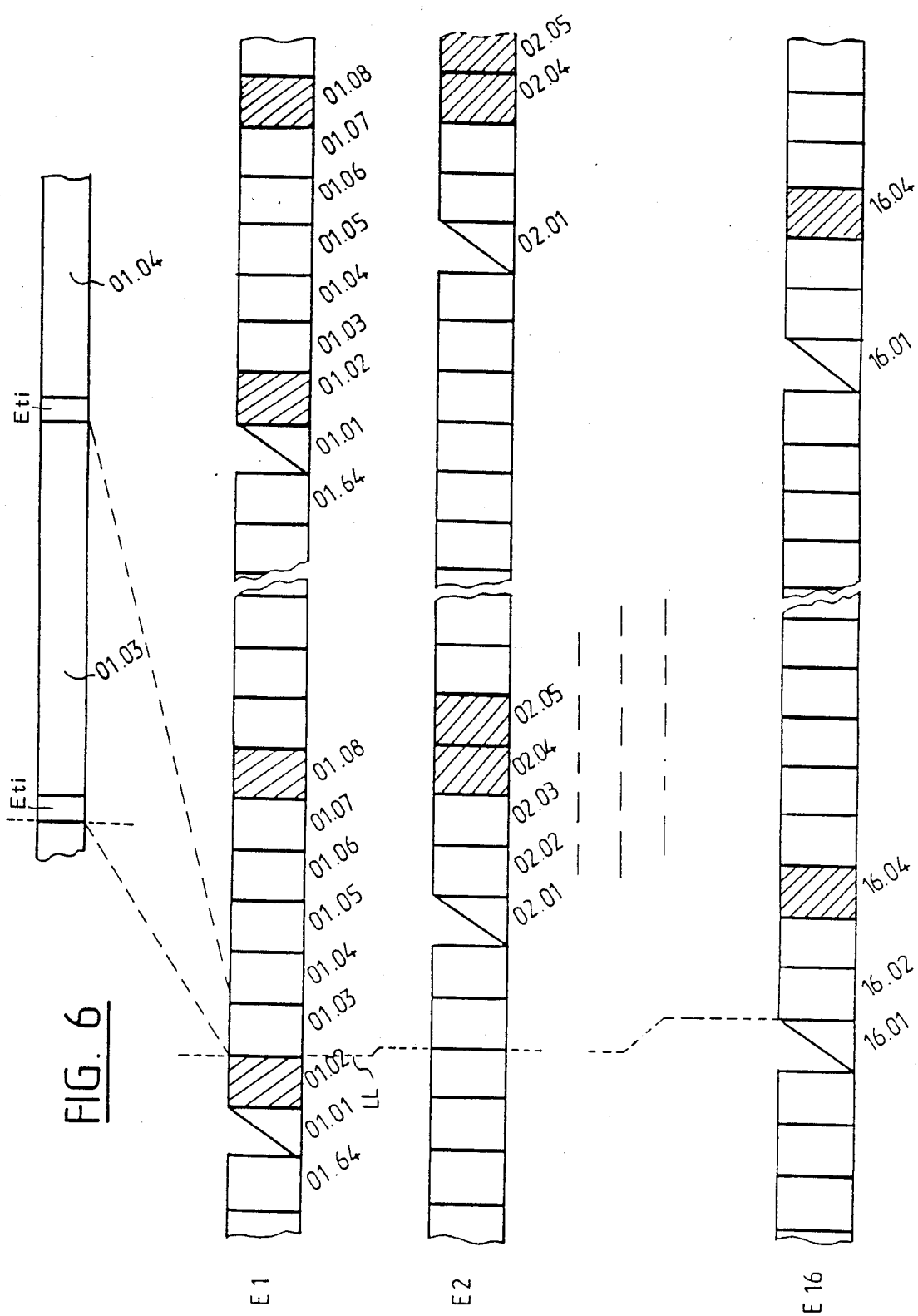

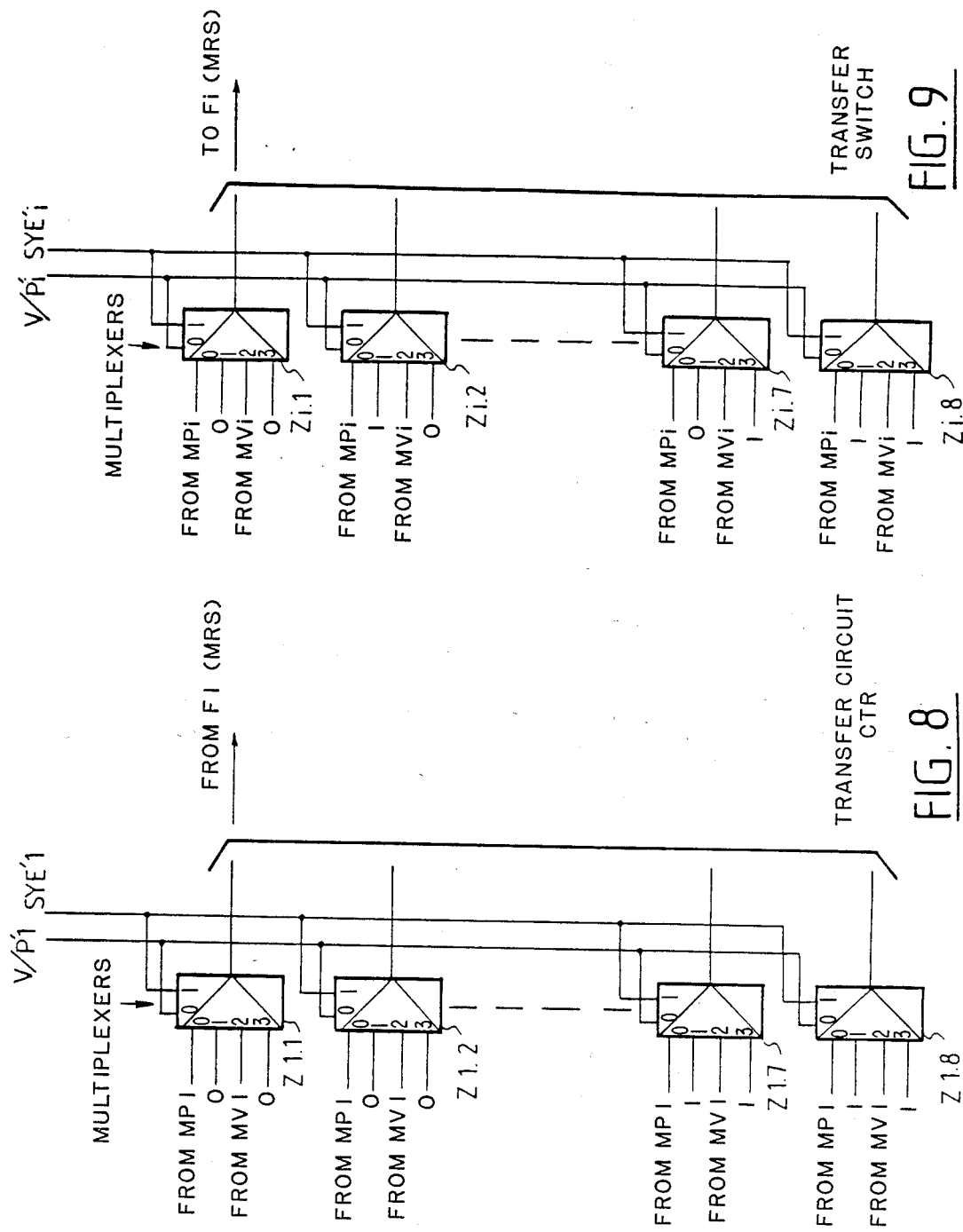

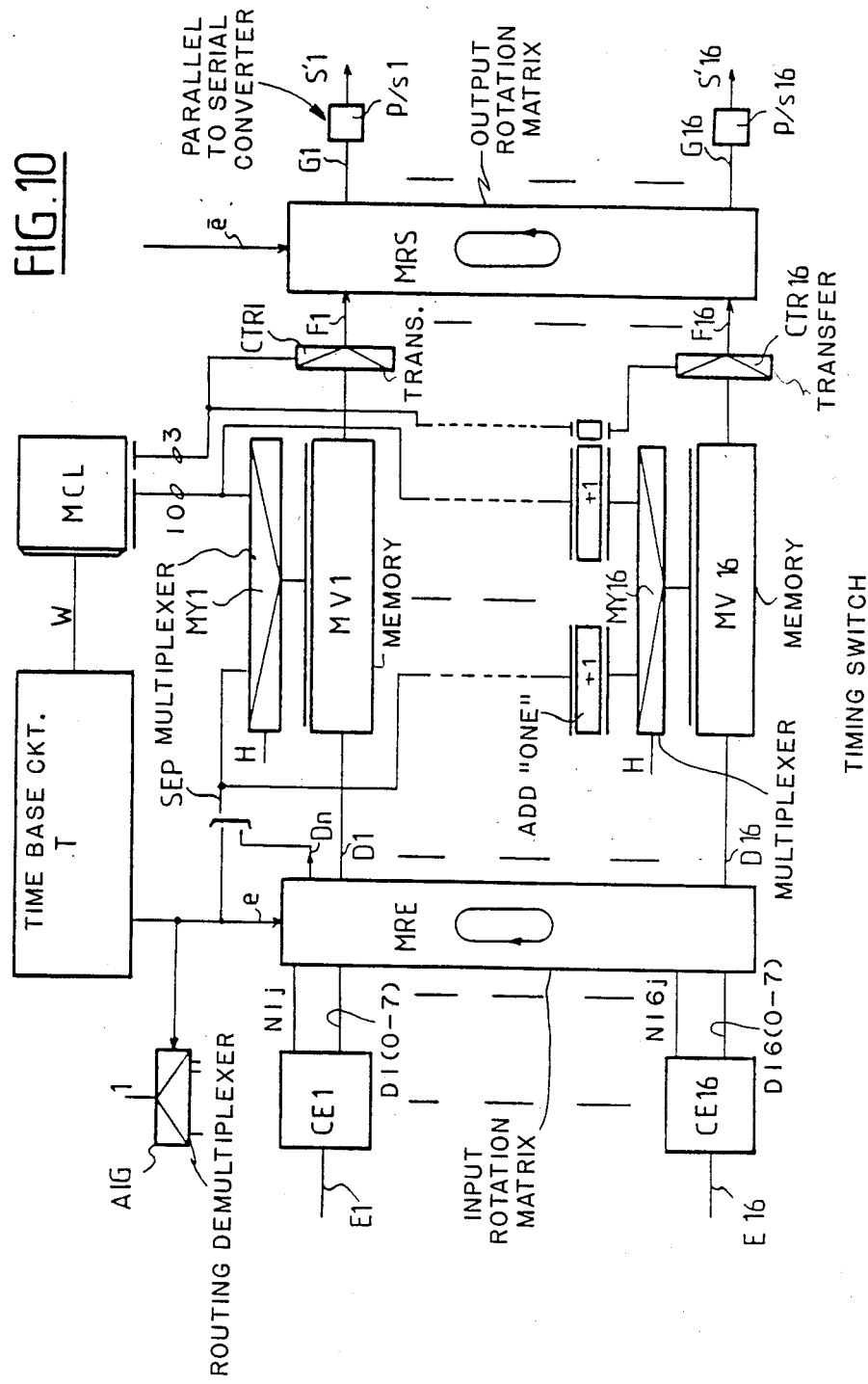

COMMUNICATION SYSTEM FOR TIMING MULTIPLEX HYBRIDS

The present invention relates to a hybrid time multiplex switching system, each entering and exiting hybrid time multiplexed signal being made up of frames having certain time intervals each of which carry one block of stream type data and of other time intervals each carrying a block of packet type data.

In a PCM time multiplex signal, the time intervals are identified, in an implicit manner, by their positions in each frame and, in the timing switches of the PCM multiplex signal, after creating a supermultiplex signal in the form of eight bit parallel words and change of the timing order of the words, a parallel demultiplexing allows the switching of the words in terms of their order in time.

A time multiplex signal in which each time interval can contain a packet having a fixed length label in front of the packet's data field, is described in European patent No. EP 0 108 028 (U.S. Pat. No. 4,603,416). A timing switch for packets transported on such multiplexes is described in European patent No. EP 0 113 639 (U.S. Pat. No. 4,594,708). In that switch, a rotation matrix is used to obtain a supermultiplex signal of parallel words in which there is a timing delay of one unit between successive words of the same packet. At the output, another rotation matrix restores, for each packet, the initial order of the words. It can be considered that the first matrix carries out a parallel to diagonal conversion or again a "paragonal" conversion.

The present tendency consists in providing hybrid time communication networks whose entering and exiting multiplexers are capable of carrying stream type information and packet type information. The time multiplex system defined in patent No. EP 0 108 028 has a suitable structure for these hybrid networks, dividing its time intervals into frames and allocating some time intervals to stream type communications and others to packet type communications, the management of the allocations being carried out, in terms of the communication needs, by a control unit.

One object of the present invention is to provide a hybrid switch system using the "paragonal" conversion for switching as well as using the blocks of stream type data as the blocks of packet type data. Below, for conciseness, we shall designate the blocks of packet type data as "packet" and the blocks of stream type data as "channel".

In accordance with a characteristic of this invention, a hybrid time multiplex switching system is provided, each hybrid time multiplex signal entering or exiting being made up of frames whose fixed length time intervals each carry one block of words that make up either a packet, or a channel, except the first time interval of each frame which contains a frame synchronization block, the entering multiplex signal being applied to a packet time switch using a paragonal conversion and having one circuit per entering multiplex signals, an input rotation matrix, a packet buffer memory, transfer circuits, an output rotation matrix, a time base, a label translation memory and storage files for the write addresses of the packets in the buffer memory and each being associated with an output multiplex, each input circuit having a synchronization circuit capable of recognizing the presence of a frame synchronization block, a file and a series-parallel word converter, in which the synchronization circuit of each input also generates to the file, the order of each time interval in the frame, this order data being transmitted from the input circuits to the input rotation matrix which has an output associated with its first output generating the said order data with which the entering multiplex data makes up a block identification data which is applied to the address input of a programmable discrimination memory whose output is connected to means for blocking the validation signals generated by the label translation memory to the address memory file, the outputs of the input rotation matrix being connected to corresponding buffer memories whose address write inputs receive the block identification data, whose read address inputs are connected to the output of a read control memory and whose outputs are connected to the corresponding inputs of transfer circuits, the address input of the read control memory receiving from the time base sequential data and generating also two signals which are applied to a switching control circuit for the transfer circuits and whose first input is connected to read inhibit means for the memory files.

In accordance with another characteristic, a switching system is provided for hybrid time multiplexes, each entering and exiting time multiplex signal being made up of frames with fixed length time intervals each carrying a block of words making up either packets or channels, except the first time interval of a frame which contains a frame synchronization block, each entering multiplex signal being applied, on one hand, to an input circuit comprising a synchronization circuit capable of recognizing the frame synchronization blocks, a file and a series to parallel word converter whose output is connected to the file whose output is the output of the input circuit, the outputs of the input circuits being connected to the inputs of an input rotation matrix whose outputs are connected, except the first, to corresponding first buffer memories, the said first output being connected to the address inputs of a first control memory, programmable with random access, the switching system comprising also a time base sequentially generating, at the rate of the byte clock, the entering multiplex identification data to the read inputs of the input circuit files, to the read inputs of the input circuit files, to the control input of the input rotation matrix and to the other address inputs of the first control memory generating a word in substitution for the word received from the first output of the input rotation matrix to a first buffer memory, and generating write validation signals to the files assigned to the output multiplex and receiving from the time base the addresses of the words stored in the first memory, the outputs of the first memories being connected to corresponding inputs of transfer circuits whose outputs are connected to the corresponding inputs of an output rotation matrix whose outputs generate, in parallel to said converters, the exiting time multiplex signal, the time base generating also the identification data of the outgoing multiplex signal to the read inputs of the said memory files and to the control input of the output rotation matrix, the outputs of the memory files generating the read addresses in the first memories, in which the synchronization circuit of each input circuit generates also, to the file, the order of each time interval in a frame, this order information being transmitted from the input circuits to the input rotation matrix which has an order output associated with its first output and generating the order information which with the identification information of the entering multiplex signal make up a block of identification data which is applied to the address input of a second discrimination programmable memory, whose output is connected to blocking means for the validation signals generated by the first control memory, the outputs of the input rotation matrix being also connected to second corresponding buffer memories whose write address inputs receive the block identification data, for which the read address inputs are connected to the output of a third control memory and whose outputs are connected to the corresponding inputs of the transfer circuits, the address input of the third control memory receiving from the time base sequential information and generating also two signals which are applied to a switching control circuit for the transfer circuits and the first of which is connected to the memory file read inhibit means.

Figure 7:
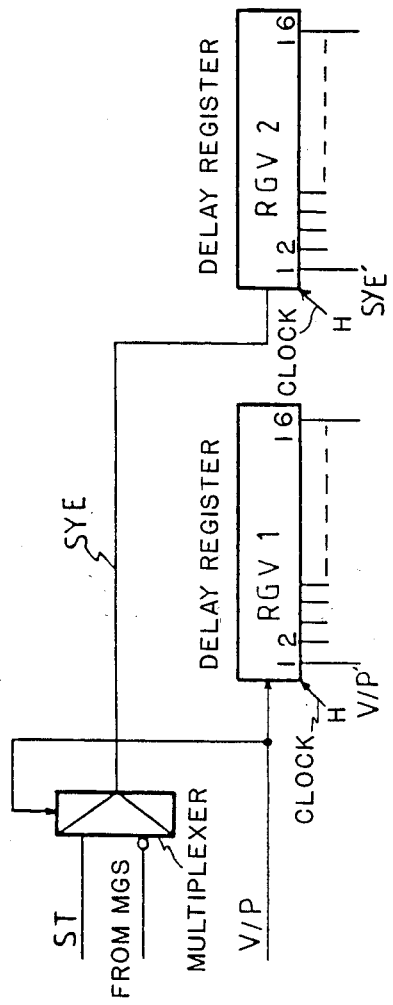
Figure 2A:
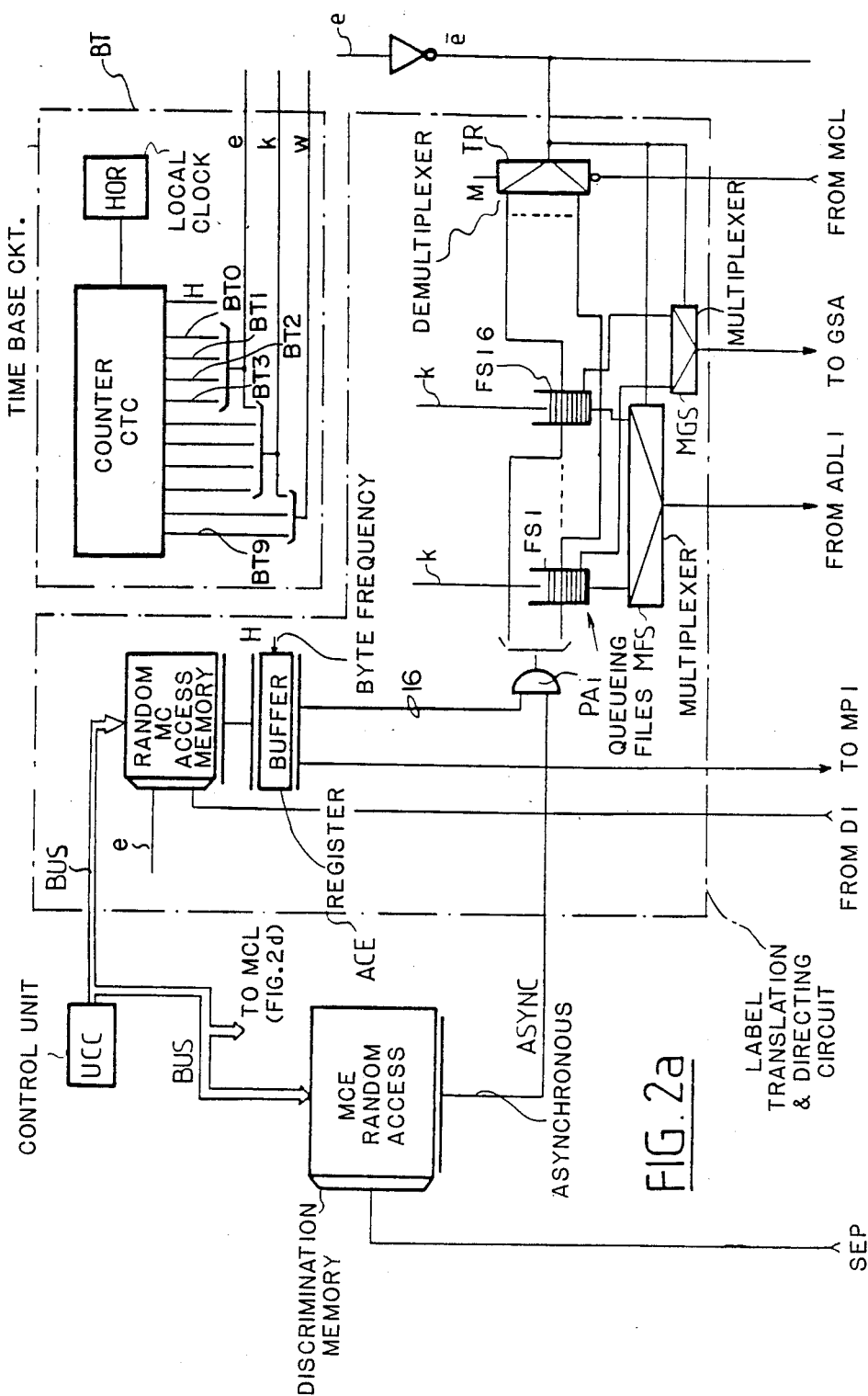
Figure 2B:
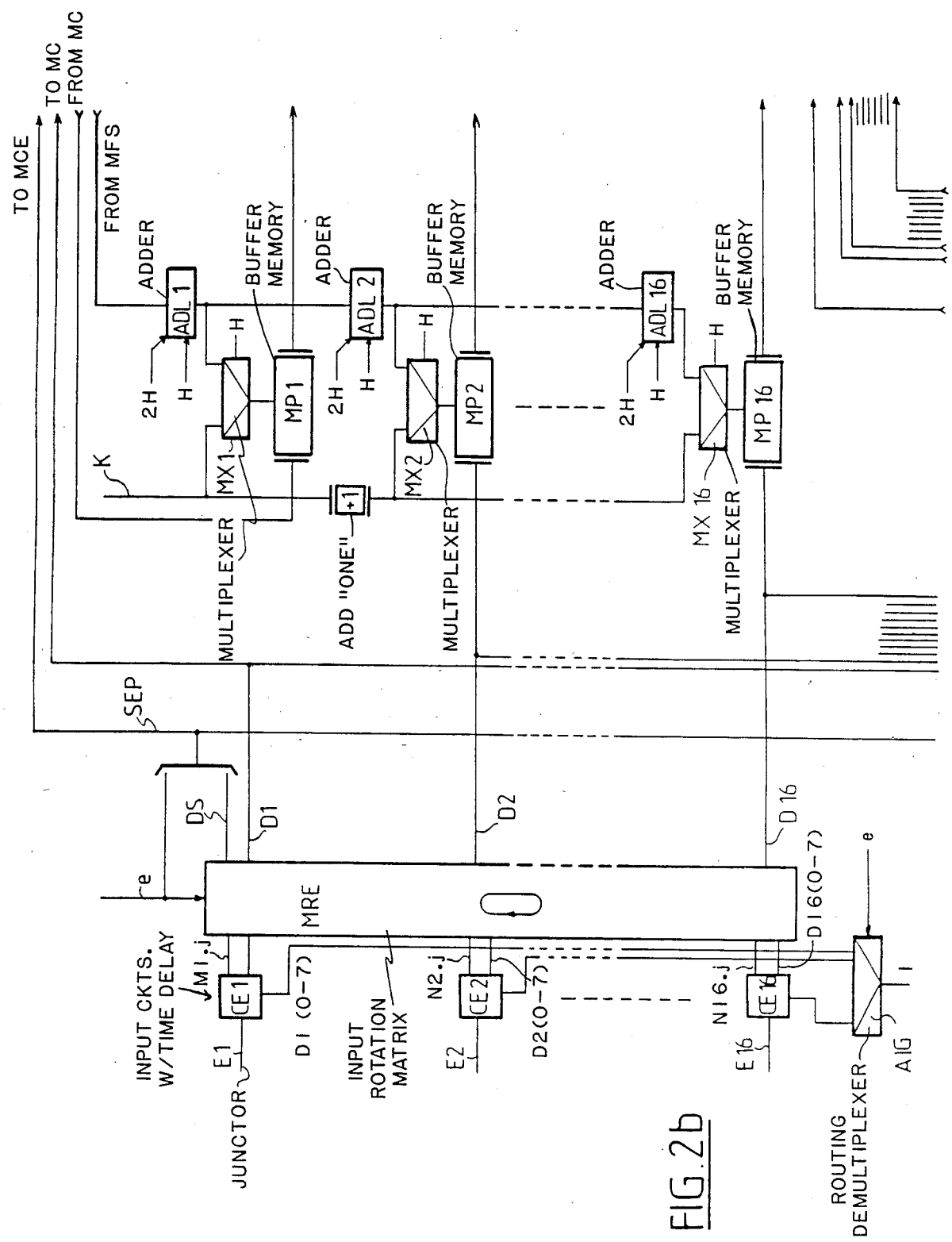
Figure 2C:
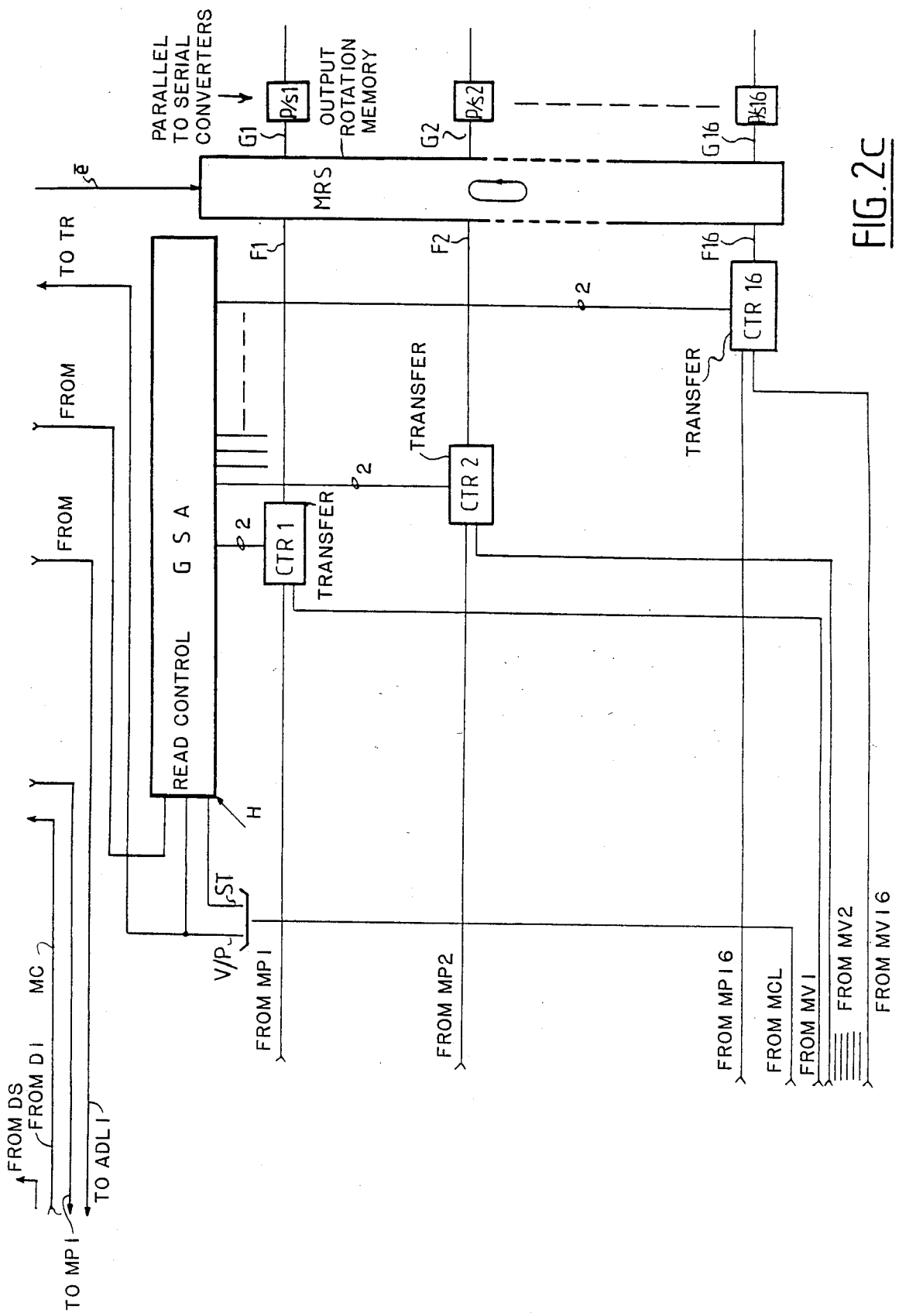
Figure 5:
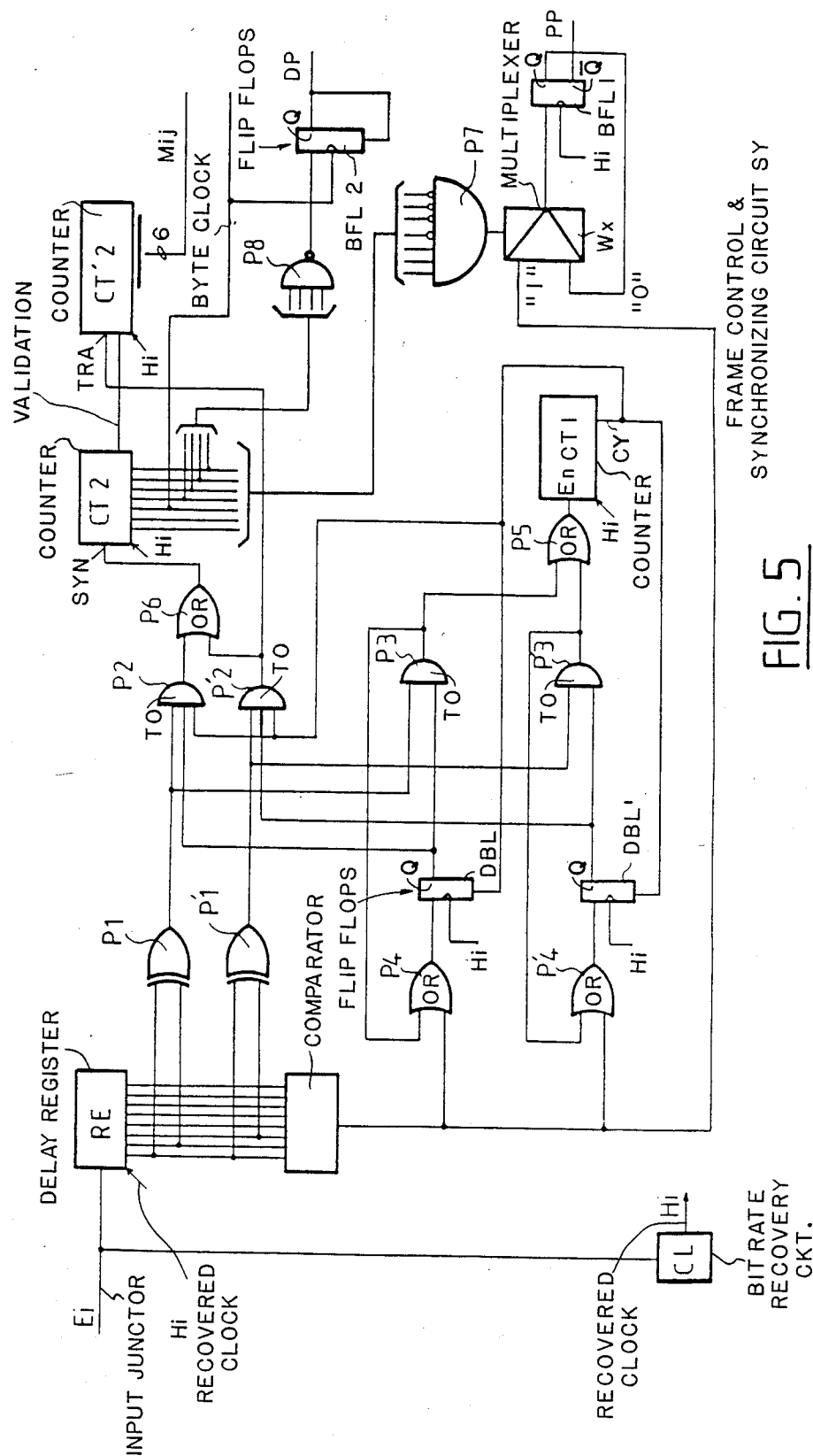
Figure 2D:
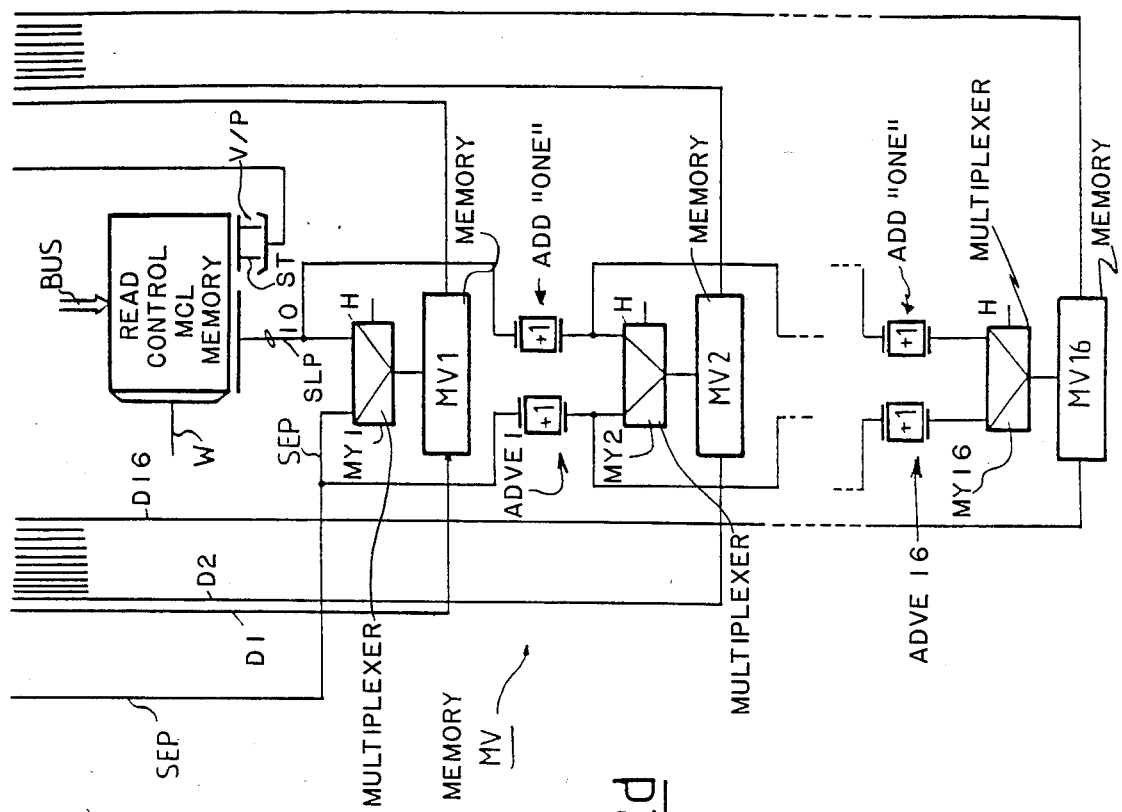
Figure 3:
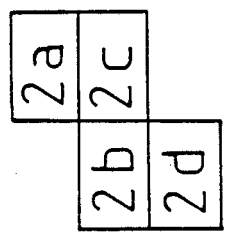
Figure 4:
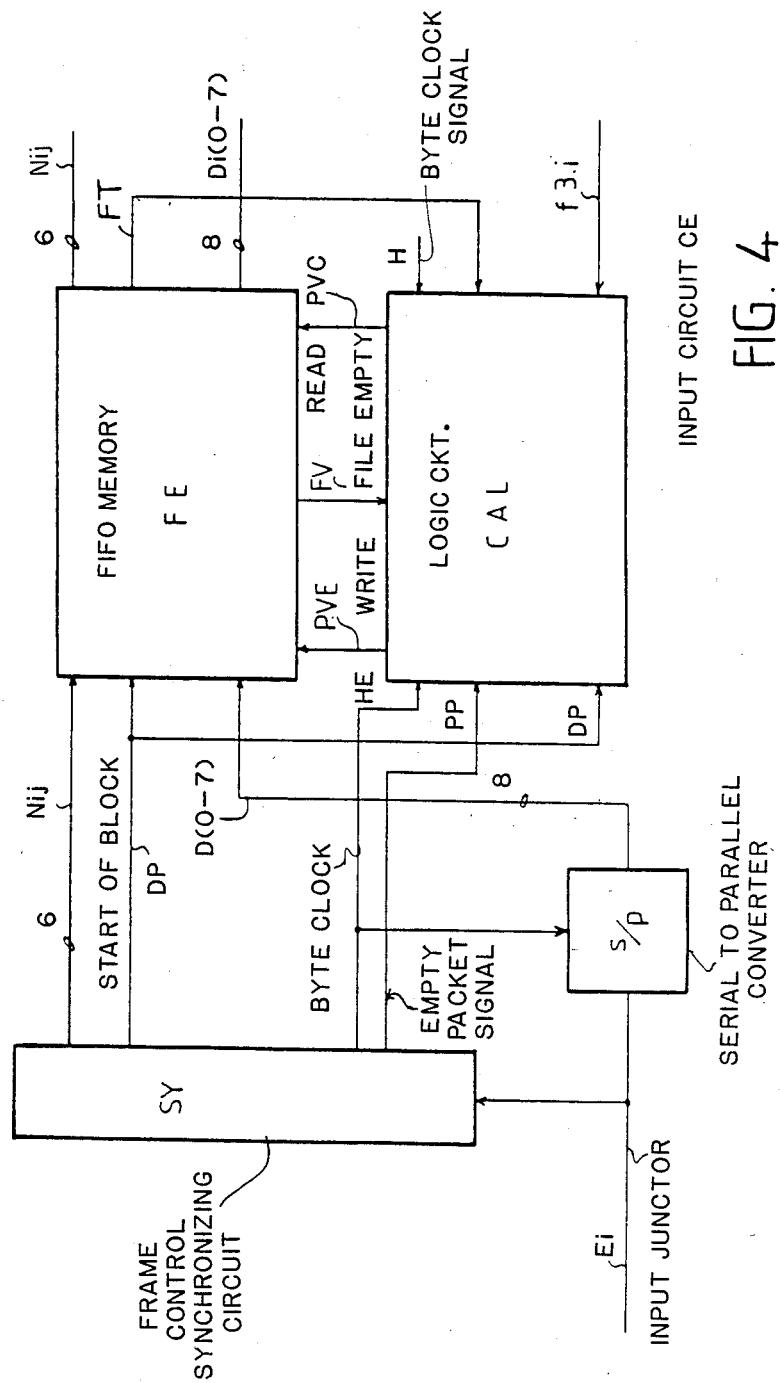

The characteristics of the above-mentioned invention, as well as others, will become clearer upon reading the description of embodiments, the description being made with reference to the attached drawings, among which:

FIG. 1 is a timing diagram of a time multiplex signal in accordance with the invention, FIGS. 2a to 2d, arranged as indicated in FIG. 3, represent the schematic of a timing switch in accordance with the invention, FIG. 4 is a block diagram of an input circuit of the switch of FIGS. 2a to 2d, to which is applied an entering multiplex signal, FIG. 5 is the schematic of the frame control and synchronization circuit used in the input circuit of FIG. 4, FIG. 6 illustrates an example of the relative positions of the entering multiplex signal at the output of the switch alignment circuits, FIG. 7 is the schematic of a block selection circuit used in the switch of the invention, FIGS. 8 and 9 are schematics of the transfer circuits of the switch in the invention, and FIG. 10 is a block diagram of a variation of the switch of FIGS. 2a to 2d.

The time multiplex signal of FIG. 1 is made up of time intervals each of which have a constant length of 16 bytes, for example. In practice, the multiplex signal of FIG. 1 has a structure analogous to that of the multiplex signal described in European patent No. EP-A-0 108 028, but the time intervals are grouped into frames and some of the time intervals carry data blocks of the stream type rather than packet type data.

In FIG. 1, the time interval ITO contains a frame synchronization block, the time interval IT1 contains a packet type block or more simply a packet, the time interval IT2 contains an empty packet, the time interval IT3 contains a block of stream type or more simply a channel, the time interval IT4 contains a packet, and so on. In the embodiment described, each frame contains sixty-four time intervals.

In practice, in a multiplex signal of the type of that of FIG. 1, the allocations of the time intervals are controlled by a control unit which acts at the source of the multiplex. We assume that this control unit, during the establishment of stream type communication, allocates it one or more time intervals per frame, this or these time intervals being always at the same location in each frame for the duration of the communication. The other time intervals, except the one which is reserved for frame synchronization, are used for the transmission of packets in the order determined by a queuing file. When the file is empty, the corresponding time interval is filed by an empty packet. The packets have conventionally a label Eti which is analyzed at the arrival point of the multiplex in order to pursue the flow of the packet.

In the embodiment described, the pattern of the frame synchronization block is:

0000111100110011 ... 00110011 (128 bits)

and the pattern of the empty packet is:

0000111101010101 ... 01010101 (128 bits)

As in the multiplex described in European patent No. EP-A-0 108 028, the pattern of the empty packets is used to guarantee synchronization at the time interval level. We note that in the embodiment described, the first bytes OF of the frame and empty packet synchronization block are identical.

The switch of FIGS. 2a to 2d comprises input circuits CE1 to CE16, a time base BT, a directing and label conversion circuit ACE, an input rotation matrix MRE, two buffer memories MP and MV, an output rotation matrix MRS, parallel to serial converts p/s1 to p/s16, a discrimination memory MCE and a control unit UCC.

FIG. 2b illustrates 16 junctions E1 to E16 carrying each a multiplex signal following FIG. 1, and connected to the inputs of the input circuits CE1 to CE16 respectively.

Each input circuit CEi, FIG. 4 comprises a serial to parallel converter s/p, a frame control and synchronization circuit SY, a file or FIFO memory FE and a logic circuit CAL. In the input circuit CEi, the input junction Ei is connected to the output of the s/p converter which generates parallel bytes and whose output is connected, by an eight wire link D(0-7), to a data input of file FE. As a drop on the input of the s/p converter is set up the SY circuit which analyzes the entering multiplex signals and which generates the input byte clock HE, a bit DP which is set to the "1" level each time that the byte applied by the wires D(0-7) is a block start byte, a bit PP which is at the "1" level each time that the entering block is not an empty packet, and a six bit word Ni.j which indicates the rank j of the concerned block in the frame of the multiplex signals at junction Ei. The input byte clock HE is applied to the control input of the s/p converter. The DP bit and the word Ni.j are applied to corresponding inputs of the file FE.

The schematic of circuit SY is shown in FIG. 5. The junction Ei is connected, in parallel, to the series input of an eight bit delay register RE and to the input of a bit rate recovery circuit CL, which generates the incident bit clock Hi. The register RE receives the signal Hi on its clock input and to its eight parallel outputs connected to the first eight parallel inputs of a comparator COMP. Among the second eight inputs, not shown, of the comparator COMP, the first four are at binary level "0" and the last four at binary level "1", which corresponds to the OF content of a first byte of a frame or empty packet synchronization block.

The parallel order "1" and "2" outputs of register RE are connected to the inputs of an exclusive-OR gate P1 while its parallel order "1" and "3" outputs are connected to the inputs of an exclusive-OR gate P'1. The output of gate P1 is connected to the first inputs of two AND gates P2 and P3 while the output of gate P'1 is connected to the first inputs of two AND gates P'2 and P'3.

The output of comparator COMP is connected to the first inputs of two OR gates P4 and P'4. The second input of gate P4 is connected to the output of gate P3 and its output is connected to the D input of a flip-flop DBL whose clock input receives the signal Hi, the Q output is connected to the second input of gate P3 and the zero reset input is connected to the CY output of a counter CT1. The second input of gate P'4 is connected to the output of gate P'3 and its output is connected to the D input of a flip-flop DBL' whose clock input receives the signal Hi, the Q output is connected to the second input of gate P'3 and the zero reset input is connected to the output CY of counter CT1.

The counter CT1 is a seven bit binary counter whose clock input receives the signal Hi and signal input En is connected to the output of an OR gate P5 whose inputs are connected to the outputs of gate P3 and P'3 respectively. When the input En is at the low level, the counter CT1 is blocked at an "8" count. Its output CY, corresponding to an "127" output count, is again connected to the second inputs of gates P2 and P'2 respectively. The third input of gate P2 is connected to the Q output of flip-flop DBL while the third input of gate P'2 is connected to the Q output of flip-flop DBL'.

The outputs of gates P2 and P'2 are connected to the inputs of an OR gate P6 respectively, whose output is connected to the SYN input of a counter CT2 which is an eight bit binary counter whose clock input receives the signal Hi. When the SYN input of counter CT2 goes to the low level, the counter is reinitialized to zero.

The output of gate P'2 is also connected to the TRA input of a counter CT'2 whose validation input is connected to the overflow output of counter CT2 and the clock input receives the signal Hi. The counter CT'2 is a six bit binary counter whose parallel outputs generate a six bit word on the link Ni.j connected to file FE, this word corresponding to the order of each time interval of its frame.

We recall FIGS. 2 and 3 of European patent No. EP-A-0 108 028 (U.S. Pat. No. 4,603,416) with regards to a detailed description of the operation of circuits RE, COMP, DBL, P1 to P3, CT1 and CT2.

In the example described, the first byte of an empty packet and a frame synchronization block is 00001111. Thus, the comparator COMP compares the parallel byte generated by delay register RE with the pattern 00001111 and, when the positive comparison is made, it generates a high level impulse, which enables, through the OR gates P4 and P'4, the transition to the "1" state of flip-flops DBL and DBL' respectively. The inputs of gates P3 and P'3 which are connected to the Q outputs of flip-flops DBL and DBL' respectively thus go the high level during the 9th bit interval.

In other respects, until the 8th bit interval, the outputs of the exclusive-OR gates P1 and P'1 are at the low level since their inputs are at "0".

In the case of an empty packet, at the beginning of the 9th bit interval, the P1 output goes to the high level. Thus, at that instant, the AND gate P3 generates a signal to the first input of OR gate P5 which generates a counting trigger signal to counter CT1 which it held until then in a blocked state to "8".

In other respects, the output signal of gate P3 is applied to the second input of OR gate P4. Thus, when in the 9th bit interval, the output of comparator COMP returns to the low level, the D input of flip-flop DBL is held at a high level.

In the case of a frame synchronization block, during the 9th bit interval, the P'1 output goes to the high level. Thus, at that instant, P'3 generates a signal to the second input of OR gate P5 which generates a counting trigger signal to counter CT1, as in the previous case.

In other respects, the output signal of gate P'3 is applied to the second input of OR gate P'4. Thus, when in the 9th bit interval, the output of comparator COMP returns to the low level, the D input of flip-flop DBL' remains at the high level.

In the case of an empty packet, the output of gate P1 remains at "1" during 119 clock periods and, similarly in the case of a frame synchronization block, the output of gate P'1 remains at "1" during 119 clock periods. Thus, in the two cases, no reinitialization occurs on counter CT1 which counts up to the value of 127 for which is output CY is enabled.

If, at the 128th bit, the output of gate P1 and the Q output of flip-flop DBL is still at "1", or if the output of gate P'1 and the Q output of flip-flop BDL' is still at "1", the output signal CY passes the AND gate P2 or the AND gate P'1, which, through OR gate P6, initializes the counter CT2 which restarts counting from 0. In other respects, the signal of the output CY resets to zero the flip-flop DBL and DBL' which blocks gate P3 or gate P'3 and the counter CT1 is reinitialized to "8".

Furthermore, in the case of the reception of a frame synchronization block, the output of gate P'2, going to the high level, initializes the counter CT'2. When the counter CT2 overflows, it authorizes the application of the clock signal, which guarantees the bit synchronization of the two counters CT2 and CT'2.

The counter CT2 has its third parallel output which supplies the byte clock HE.

The flip-flop BFL1 has its clock input which receives the signal Hi, its D output which is connected to the output of a multiplexer its Q output connected to the "0" data input of multiplexer WX and its Q output which supplies the signal PP. The "1" data input of multiplexer WX is connected to the output of comparator COMP and its control input connected to the output of an AND gate P7 with three direct inputs connected to the first three parallel outputs respectively of counter CT2 and four inverting inputs connected to the next four outputs respectively of the same counter CT2.

The output of gate P7 goes to the high level one byte interval after each transition to zero of counter CT2. At that instant, in the case of an empty packet or of a frame synchronization block, the "1" input of multiplexer WX is at "1" which the flip-flop recopies by placing to the low level the signal PP. In the opposite case the multiplexer WX generates a low level signal and the signal PP goes to the high level. The signal PP is used in the logic circuit CAL (FIG. 4) to allow entry into the file FE only the packets and channel blocks.

A flip-flop BFL2 has its clock input which receives the signal HE, its D input which is connected to the output of a NAND gate P8 with four inputs connected to the last four outputs of counter CT2 respectively, and its Q output which generates the DP signal and which is also connected to its zero reset input.

The input of flip-flop BFL2 is set to "1" after each first byte of a block and its Q output does indeed transfer to file FE the start of block signal DP.

The file FE thus contains a sequence of words each with 15 bits. Its size is larger than 16 words. Its data outputs are respectively connected to eight wires Di(0-7), to six wires Ni.j(0-5) and to an output packet start wire ST.

The file FE operates under the control of logic circuit CAL which comprises the same discrete components (gates, flip-flops and inverters) as those which are shown in FIG. 2 of patent No. EP-A-0 113 639 or still in FIG. 1 of patent No. EP-A-0 113 307. The logic circuit CAL provides to the file FE the write PVE and read PVC signals. It receives the input byte clock signal HE, the output byte clock signal H, the presence of empty packet signal PP, the start of block input signal DP, the output of block ST, the file empty state FV supplied by file FE and the read synchronization signal f3.i.

The operation of the set of the file FE and the logic circuit CAL is described in detail in the above-mentioned European patents.

In practice, the input circuits CE1 to CE6, FIG. 2b, constitute the time delay means for the entering multiplex channels E1 to E16, which are plesiochronous in terms of bit rate, such that the outgoing headers from circuits CE1 to CE16 are generated sequentially at the rate of the output byte clock HL. The delay is guaranteed by that of the signals f3.1 to f3.16 applied to the circuits CAL of the different circuits CE1 to CE16, as shown in the sequel.

In FIG. 6, we have shown sequences of frames which make up the multiplex channel signals E1 to E16 respectively. Each time interval is recovered by two values: the order i of the multiplex channel to which it belongs and its order j in each frame. The frame synchronization blocks are represented by triangles; the packets are represented by white squares and the channels by hatched squares. Furthermore, we have shown on a larger scale the packets 01.03 and 01.04.

The path of the line LL, with dashes, corresponds to the instants at which the circuits C1 to C16 generate the 16 start of blocks of the multiplex E1 to E16 respectively. We observe that from one multiplex to the other there is a delay of one byte, which is caused by the delay of one f3.i signal to the next. These delays generate a diagonal alignment of the blocks. In other words, we can say that there is a diagonal synchronization of the blocks.

However, FIG. 6 shows that the frames from different multiplex channels are randomly arranged. Thus, the synchronization block of multiplex channels E1 is ahead by four blocks on that of multiplex channels E2, but only ahead by one block on that of multiplex channels E16. We shall see the consequences of this situation below.

FIG. 6 also illustrates that the channels, such as 01.02, 01.08, 02.04, 02.05, . . . , 16.04, are always at the same place in their frames respectively. However, from one frame to the next, packets of the same order can belong to different communications.

In FIG. 2b, the outputs Di(0-7) and Ni.j(0-5) of the input circuits CE1 are connected to the corresponding inputs respectively of the rotation matrix MRE whose purpose is the same as that of the rotation matrix MRE shown in FIG. 4 of patent No. EP-A-0 113 639. The matrix MRE has a rotation control input to which is applied a signal e which varies cyclically from 0 to 15 and which implicitly identifies the entering multiplex.

The first output of the matrix MRE is a 14 wire output which can be broken down into one output D1 with eight wires and one output Ds with six wires. The output D1 generates in succession the first bytes of the entering multiplex blocks and the D2 the orders Ni.j of the blocks in their frames. The other fifteen eight wire outputs D2 to D16 are outputs which generate the second bytes to the sixteenth bytes of the blocks respectively. For each block, the ith byte is generated, by the Di output, one byte duration ahead of the (i+1)th byte of the block generated by the output D(i+1). We observe that the outputs D2 to D16 have only eight outgoing wires, which means that the six wires which would transmit the order Ni.j are not connected.

In practice, the six wires of the output Ds give only the order of the block in a frame of 64 blocks, but do not identify the entering multiplex channel among sixteen. That is why, to the six wires of the output D2 are associated the four wires of signal e, identifying the entering multiplex channels, to make a bundle of ten wires SEP which is connected, on one hand, to the address input of the discrimination memory MCE, FIG. 2a, and, on the other hand, to the first input of a multiplexer MY1, FIG. 2d, associated with the memory MV.

The memory MCE is a random access memory which contains, for each block Ni.j discrimination data, for example, either a "1" bit if the block corresponds to a channel or a "0" bit if the block corresponds to a packet. We recall that the empty packets and the frame synchronization blocks are removed at the input of the files FE from the input circuit CEi.

The write input of the discrimination memory MCE is connected, by a bus BUS, to the switching control unit UCC which supervises the channel and packet communications going across the switch and which in terms of the new communication links to establish or terminate, modifies, by the bus, the contents of memory MCE. Finally, the memory MCE has an ASYNC output which is connected to the first input of a series of sixteen AND gates PA1 to PA16. In other words, when the information Ni.j. which is applied to the address input of memory MCE corresponds to a channel, the first inputs of gates PA1 to 16 are at the low level, when they correspond to a packet, they are at a high level.

In other respects, the DI output of matrix MRE is connected on one hand, to the data input of the label translation and directing circuit ACE, FIG. 2a, and, on the other hand, to the input of a memory MV. The data output of circuit ACE is connected to the input of a buffer memory MP1. The outputs D2 to D16 are connected respectively, by eight bit links, on one hand, to the inputs of buffer memories MV2 to MV16. The set of memories MP1 to MP16 make up the first buffer memory MP and the set of memories MV1 to MV16 make up the second buffer memory MV.

The time base BT is comprised of local clock signal source HOR at frequency 2H and a binary counter CTC. The input of the binary counter CTC is connected to the output of source HOR, its first output H generates a signal at the byte frequency H, and, from its ten outputs BT0 to BT9, the output group BT0 to BT3 make up what is commonly called the link e, the set of outputs BT0 to BT7 make up what is commonly called a link K and the set of outputs BT0 to BT9 make up what is called a link W. The byte frequencies H and HE, FIG. 5 are plesiochronous.

The bundle e is connected to the control input of a directing demultiplexer AIG whose data input is at the high level and whose outputs are the sixteen wires f3.1 to f3.16 connected to the logic circuits of the input circuits CE1 to CE16, respectively. Thus, the successive signals applied to wires f3.1 to f3.16 cause the read enables of circuits CE1 to CE16 to be sequential, with a one bit delay from one to the other.

The direction and label translation circuit ACE comprises a random access memory MC, sixteen queueing files FS1 to FS16, a demultiplexer, and two multiplexers MFS and MGS plus the sixteen AND gates PA1 to PA16. The memory MC has address inputs with twelve wires, of which four are connected to the bundle e and eight to the output D1 of the matrix MRE. Its write inputs are connected by bus BUS, to the control unit UCC and its read outputs have twenty-four wires of which eight are connected to the data inputs of memory MP1 and of which sixteen are connected to the second inputs of sixteen gates PA1 to PA16 respectively, through a register BUFFER receiving the clock H.

Each queueing file FSi has its data input connected to bundle K, its data output connected to a corresponding input of multiplexer MFS, its write control wire connected to corresponding gate PAi respectively, its read control input connected to a corresponding input of demultiplexer TR and its empty file indicator wire connected to a corresponding input of multiplexer MGS.

In practice, as previously described in patent No. EP-A-0 113 639, the memory MC receives the first bytes of each entering block and in relation with the identity of the multiplex carrying the block, the identity given by the bundle e generates at the output a new label on the eight wires to the memory MP1 and designate the outgoing link concerned by activating one of its sixteen other wires in order to be able to write into the corresponding queueing file FSi the address to which the new label is written in the memory MP1, this address being given in link K, which is connected to the first input of multiplexer MX1. In the embodiment described, if the first byte of a block is a packet label, the corresponding gate PAi is open and the operation unfolds as described, but if it is the first byte of a channel the gate PAi is not open by memory MCE and no address is stored in the file FSi. Also, in this latter case, the memory MC does not generate a real new label, because the control unit UCC has not transmitted any to it. In practice, the word which was present during the previous byte interval is anyhow present in the memory MP1. We shall see below that this has no importance.

Each memory MPi is associated with a multiplexer MXi and a register-counter ADLi, and the set of these circuits operates as described in patent No. EP-A-0 113 639 to which we can refer. We shall remember that the multiplexers MXi are controlled by the clock signal H which at the high level allows the write addressing by the first input and at the low level allows the read addressing by the second input. In writing, the diagonal output arrangement of the station matrix MRE does not require incrementing of address by passing from a memory MPi to the memory MP(i+1); in reading the incrementing is done by the circuits ADLi. The adder +1 shown in FIG. 2b is only introduced to compensate for the processing time in memory MC.

In other respects, memory MV is associated with a read control memory MCL whose address inputs are connected to the ten wire bundle W and the data input to the control unit UCC, by bus BUS. Its data outputs comprise ten addressing wires, a control wire V/P and a control Wire ST. The read control memory MCL receives from the control unit UCC the addresses of the channel bytes which must be transmitted on an outgoing multiplex at a byte time determined by the bundle W. For each channel byte to be transmitted on an output junction, the control wire V/P is set at level "1". Finally, the control wire is set to level "1" when the outgoing junctions need to transmit a frame synchronization block.

In the embodiment described, the frame synchronization blocks are transmitted in synchronism on all the outgoing junctions.

The memory MV1 has its address input connected to the output of a two input multiplexer MY1 whose first input is connected to bundle SEP, whose second input is connected to bundle SLP and whose control input receives the byte clock H. Each memory MVi, other than memory MV1, is associated with a two input multiplexer MYi and to two adders ADVEi and ADVLi. Each multiplexer MYi has its first data input connected to the output of adder ADVEi and its second data input connected to the output of adder ADVLi, its control input receiving the clock signal H. The signal H at high level enables write addressing and at low level enables read addressing. The inputs of adders ADVEi and ADVLi are connected to the inputs of multiplexer MY-(i−1).

The data inputs of memories MV1 to MV16 being directly connected to the outputs D1 to D16 of the rotation matrix MRE, all the bytes of all the blocks are stored in the memories MV1 to MV16. As a result, each of the memories must have a capacity of 64 bytes per frame multiplied by 16 entering multiplex, that is $2^{10}$ bytes. That is why the bundle SEP has 10 wires for the write address of a byte and a bundle SLP has ten wires for the read address of a byte. The adder ADVE2 adds one bit to the address transmitted by SEP such that the second byte of a block can be stored in the memory MV2 with a delay of one byte which corresponds to the fact that this second byte is generated by the matrix MRE one byte interval after the first byte. The subsequent adders ADVEI have the purpose of adding the subsequent delays. Thus, if we consider the memory MV in its entirety, we observe the same "paragonal" arrangement as in the memory MP.

The adders ADVLi which are used for the reading of bytes have an equivalent purpose.

The data outputs of memories MPi and MVi are connected to two data inputs of a transfer circuit CTRi respectively whose output is connected to the input Fi of the output rotation matrix MRS.

The output wire V/P of memory MCL is connected, on one hand, to one input of a read control circuit GSA which is shown in detail in FIG. 7. When the wire V/P is at the "1" level, it inhibits the output of demultiplexer TR such that the queueing file FSi which would have been queried by reading for the junction count of output Si is not read.

The circuit GSA, FIG. 7, has a multiplexer MLS of which one non-inverting input is connected to wire ST coming from the memory MCL and one inverting input is connected to the output of multiplexer MGS. Its control input is connected to wire V/P. The circuit GSA also has two delay registers RGV1 and RGV2 with sixteen stages each, which receive the clock signal H. The signal input of register RGV1 is connected to a wire V/P and that of register RGV2 to the output of multiplexer MLS. In practice, the registers RGV1 and RGV2 recopy on their respective outputs V/P' and SYE', by delaying them at the clock rate H, the signals V/P and SYE applied at their inputs. These outputs are, according to their order, connected to the two corresponding inputs, respectively, of sixteen transfer circuits CTR1 to CTR16.

The pair of signals V/P' and SYE' takes on the binary value 00 when the block to be transmitted is from a packet, 01 when the block to be transmitted is that of an empty packet, 10 when the block to be transmitted is that of a channel, and 11 when the block to be transmitted is a frame synchronization block. This can be verified easily on the schematic of FIG. 7. Thus, with V/P at "1" and ST at "0", the signal SYE is at "0", which brings about the delay of the channel transmission pair 10.

The transfer circuit CTR1, FIG. 8, comprises eight four input multiplexers Z1.1 to Z1.8 of which two control inputs are connected to the first outputs of registers RGV1 and RGV2 respectively. The first inputs of multiplexers Z1.1 to Z1.8 are connected to the eight output wires of memory MP1 respectively, the second and fourth inputs of multiplexers Z1.1 to Z1.4 are at level "1" while the corresponding inputs of multiplexers Z1.5 to Z1.8 are at level "1" and the third inputs of multiplexers Z1.1 to Z1.8 are connected to the eight wires of memory MV1 respectively. It should be understood that the transfer circuit CTR1 can transmit either the label of a packet, either the first byte of a channel, or the first byte of an empty packet or a frame synchronization block, the latter having the same configuration.

The transfer circuit CTRi (with i different than 1), FIG. 9, comprises also eight four input multiplexers Zi.1 to Zi.8 whose two control inputs are connected to the ith output of registers RGV1 and RGV2. The first and third inputs of all the multiplexers are connected to the corresponding outputs of memories MPi and MVi respectively. The second inputs of multiplexers Zi.1, Zi.3, Zi.5 and Zi.7 are at level "0" while those of the others are at level "1". The fourth inputs of multiplexers Ai.1, Zi.2, Zi.5 and Zi.6 are at level "0" while those of the others are at level "1".

The transfer of packets from memory MP and of channel blocks from memory MW towards the output matrix is controlled, with regards to memory MP by the demultiplexer TR which receives the word e which is used to select a queueing file FSi from sixteen, and with regards to memory MW, by the address word transmitted by the bundle W to the memory MCL, the bundle W including the information e. It thus appears that at the probing time of an output junction Si, there is synchronism in the operation of TR and MCL. The conflict between the two processes, reading of MP or of MW, is controlled by the signal V/P which can inhibit the operation of multiplexer TR. Note that, in W, we have not inserted the bundle e because the memory MCL is supposed to implicitly perform the inversion. The insertion of a frame synchronization block is processed like the inversion of a channel, except that the pattern of this block is called in the transfer circuits CTRi.

The output rotation matrix MRS replaces in series by routing, in conformity with its control e, the sequence of parallel bytes from the blocks. Finally, the parallel to serial P/Si converters serialize the bytes in such a manner as to generate multiplexes having a structure equivalent to that of FIG. 1.

The switch of FIG. 10 comprises, like that of FIGS. 2a to 2d, input circuits CE1 to CE16, a time base BT, an input rotation matrix MRE, a buffer memory MV, and output rotation matrix MRS, parallel to serial converters P/S1 to P/S16, and a read control memory MCL. The sixteen junctions E'1 to E'16 each carry a time multiplex signal arranged a frame, like that of FIG. 1, but in which all the time intervals, except those carrying the frame synchronization blocks are reserved for channels. In other words, the multiplexes at junctions E1' to E'16 do not carry any packet.

Each input circuit CEi is identical to the one shown in FIG. 4 and generates the channel bytes in parallel, as well as the orders of the channels in each frame. A routing circuit AIG guarantees the diagonal output of the channel blocks which are applied to the inputs of the rotation matrix MRE respectively.

The matrix MRE converts the diagonal structure into a paragonal structure. It has sixteen outputs D1 to D16 generating the bytes according to their order in each block respectively, plus an output Dn, associated to the output D1, which generates the order of the block in the frame. The control input of matrix MRE also receives the information e from the time base BT.

The memory MV can be broken down into sixteen memories MV1 to MV16 whose address inputs are connected to the outputs of sixteen multiplexers MY1 to MY16 respectively.

The output Dn, generating the order Ni.j of the blocks, is associated with the information e to determine the write address of the first byte in the first basic memory MV1 of memory MV. In practice this information address is applied to the first input of a multiplexer MY1. Between the write address input of multiplexer MY1 and that of multiplexer MY2, not shown, we provide an adder +1, as in the switch of FIGS. 2a to 2d.

The read control memory MCL is addressed by the bundle W exiting from the time base BT and generating read addresses into the memory MV at the read address input of multiplexer MY1. For reading like for writing, an adder +1, is provided between the multiplexers MY1 and MY(i+1). The outputs of memories MV1 to MV16 are connected to the first inputs of sixteen transfer circuits CTR1 to CTR16 respectively which are identical to the circuits having the same references in the switch of FIGS. 2a to 2d. However, in the variation of FIG. 10, since there are no packets to switch, but only channels, the wires allowing the transmission of packets or of empty packets can be separated. In the transfer circuits, we keep the wires coming from the memories MV1 to MV16 and those which allow the synthesis of frame synchronization blocks.

To select the data to be transmitted by the transfer circuits, a control wire is provided between the output of the read control memory MCL and the transfer circuits, by providing a delay between one circuit CTRi and the next.

The outputs of transfer circuits CTR1 to CTR16 are connected to the inputs F1 to F16 of the output rotation matrix MRS whose outputs G1 to G16 are connected to converters P/S1 to P/S16 respectively which generate on junctions S'1 to S'16 multiplexes containing only channel blocks as well as frame synchronization blocks.

The control input of matrix MRS receives the information e and those of the multiplexers MYI to MY16 receive the byte clock H.

As a variation, in the case where time intervals may not be used by channel blocks, the transfer circuits CTR1 to CTR16 can insert empty packet patterns. Two wires are then necessary between the memory MCL and the transfer circuits.

The embodiments of the invention in which an exclusive property or privilege is claimed are defined as follows:

1. A hybrid time multiplex switching system, in which entering time multiplex signal and outgoing multiplex signals are made up of time frames having fixed length time intervals, each interval carrying a block of words that make up either a packet or a channel, except for a first time interval of each of said frames which contains a frame synchronization block, the entering multiplex signals being applied to a packet time switch using a paragonal conversion and having one input circuit for each of said entering multiplex signals, an input rotation matrix, a packet buffer memory, transfer circuits, an output rotation matrix, a time base clock circuit, a label translation memory circuit and memory file circuit for giving a packet write addresses into the packet buffer memory, each write address being associated with output multiplex signals, each of said input circuits comprising a synchronization circuit capable of recognizing the presence of a frame synchronization block, a file circuit and a word serial to parallel converter, the synchronization circuit of each of said input circuits generating file order data for each time interval in a frame, the order data being transmitted from the input circuits to the input rotation matrix which has an output and generating the said file order data which with identification data of the entering multiplex signal makes up a block identification data which is applied to an address input of a programmable discrimination memory whose output is connected to means for blocking validation signals generated by the first label translation memory to address storage files, outputs of the input rotation matrix being also connected to corresponding buffer memories having write address inputs which receive the block identity data, said buffer memories having read address input connected to the output of a read control memory and outputs of said buffer memories connected to the corresponding inputs of transfer circuits, address input of a third read control memory receiving data from the time base clock circuit and also generating two signals which are applied to a switch control circuit for the transfer circuits and for which the first is connected to means of inhibiting the reading of the storage means.

2. A switching system in accordance with claim 1 in which, in the absence of a packet to be transmitted, each time interval allocated to packets is filled with data forming an empty packet, each empty packet comprising a first byte whose make up is identical to that of a frame synchronization block, but is disallowed for other packets, the contents of the remainder of the empty packet being distinct from that of the frame synchronization block, the synchronization circuit recognizing an empty packet and, in the case of recognition of an empty packet or of a frame synchronization block, said synchronization circuit generating a signal inhibiting their writing in the file.

3. A switching system in accordance with claim 1 in which the switch control circuit is a logic processing circuit which, in response to receiving the two control signals from the third control memory and an empty file signal for any of the memory files, causes the transfer circuits to switch such that they connect to corresponding inputs respectively of the output rotation matrix, either the first buffer memories or the second buffer memories, either to the first internal memories of the transfer circuits containing bytes forming an empty packet, or to second interval memories of the transfer circuits containing bytes of a frame synchronization block respectively.

4. A hybrid time multiplex switching system comprising a plurality of incoming multiplex channels which are divided into fixed length time frames that may be carrying signals in the form of either data packets or channel signals, each time frame beginning with a synchronization block of signals, said data packets and channel signals being retransmitted by said system on outgoing time division multiplex channels by using a paragonal conversion, said hybrid time multiplex switching system comprising an input circuit individually associated with each of said multiplex channels for receiving incoming data packet or channel signals, a rotational memory coupled to receive signals from said input circuits, means responsive to said rotational memory for buffer storing said received signals, label translation memory means for writing a new label for data to be retransmitted over said outgoing time division multiplex channels, means for ordering said received signals in said buffer store and for applying said new label thereto, and means for retransmitting said newly labeled signals on a newly timed bases over said outgoing time division multiplex channels.

5. The system of claim 4 and a file for storing data words, and means for generating file order data for identifying data which is assembled and transferred for readout.

6. The system of claim 5 and programmable discriminating memory means for controlling the readout of said data.

7. The system of claim 5 wherein each of said input circuits comprises a synchronization circuit means responsive to synchronizing signals in said received signals for generating file orders at each time interval in a frame, said file orders identifying the received signals.

8. The system of claim 7 and local clock means for providing said new timing of said retransmission.

9. The system of claim 4 wherein some of said data packets are empty, said empty packets being identified by a first byte which is identical to a first byte in said synchronization block and with a remainder of said synchronization block being distinctive signals that identify empty data packs, and means responsive to said distinctive signals for inhibiting retransmission of said empty packets.

* * * * *